United States Patent
Goldfarb et al.

(10) Patent No.: US 8,483,672 B2
(45) Date of Patent: Jul. 9, 2013

(54) SYSTEM AND METHOD FOR SELECTIVE MONITORING OF MOBILE COMMUNICATION TERMINALS BASED ON SPEECH KEY-PHRASES

(75) Inventors: Eithan Goldfarb, Ness Ziona (IL); Yoav Ariav, Kfar saba (IL)

(73) Assignee: Verint Americas, Inc., Alpharetta, GA (US)

( * ) Notice: Subject to any disclaimer, the term of this patent is extended or adjusted under 35 U.S.C. 154(b) by 0 days.

(21) Appl. No.: 13/358,485

(22) Filed: Jan. 25, 2012

(65) Prior Publication Data

US 2012/0220271 A1    Aug. 30, 2012

(30) Foreign Application Priority Data

Jan. 27, 2011    (IL) .......................................... 210898

(51) Int. Cl.
*H04M 3/42*    (2006.01)
(52) U.S. Cl.
USPC ..................... 455/414.1; 455/413; 455/422.1; 379/88.01; 704/216
(58) Field of Classification Search
USPC ... 455/414.1, 413, 422.1; 379/88.01; 704/216
See application file for complete search history.

(56) References Cited

U.S. PATENT DOCUMENTS

2006/0035658 A1* 2/2006 Yoon et al. ..................... 455/518
2011/0244843 A1* 10/2011 Shostak ......................... 455/417

FOREIGN PATENT DOCUMENTS

WO    2010116292 A2    10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
Asokan, N., et al., "Man-in-the-Middle in Tunneled Authentication Protocols," Draft version 1.3 (latest public version: http://eprint.iacr.org/2002/163/, Nov. 11, 2002, 15 pages.
Vedaldi, Andrea, "An implementation of SIFT detector and descriptor," University of California at Los Angeles, 7 pages.
Girardin, Fabien, et al., "Detecting air travel to survey passengers on a worldwide scale," Journal of Location Based Services, 26 pages.
Meyer, Ulrike, et al., "On the Impact of GSM Encryption and Man-in-the-Middle Attacks on the Security of Interoperating GSM/UMTS Networks," IEEE, 2004, 8 pages.

* cited by examiner

*Primary Examiner* — Nghi H Ly
(74) *Attorney, Agent, or Firm* — Meunier Carlin & Curfman

(57) ABSTRACT

Methods and systems for monitoring mobile communication terminals. A correlation system selects candidate communication terminals to be monitored, and then attempts to identify whether the candidate terminals are indeed operated by target users. Following successful correlation of a candidate terminal with a target user, various surveillance actions can be performed with respect to the terminal. Correlation of candidate communication terminals with target users is based on identification of speech key-phrases. When evaluating a given candidate terminal, the system analyzes speech that is communicated via the candidate terminal and attempts to detect one or more of the speech key-phrases in the analyzed speech.

20 Claims, 2 Drawing Sheets

SYSTEM AND METHOD FOR SELECTIVE MONITORING OF MOBILE COMMUNICATION TERMINALS BASED ON SPEECH KEY-PHRASES

FIELD OF THE DISCLOSURE

The present disclosure relates generally to communication networks, and particularly to methods and systems for monitoring mobile communication terminals.

BACKGROUND OF THE DISCLOSURE

Various applications, such as Lawful Interception (LI) applications, monitor mobile communication terminals that communicate over wireless communication networks.

SUMMARY OF THE DISCLOSURE

An embodiment that is described herein provides a method including maintaining a list of target users of a communication network and respective speech phrases that are characteristic of the target users. A plurality of candidate communication terminals are selected from among multiple communication terminals in the communication network based on a selection criterion. Speech that is communicated via the candidate communication terminals is analyzed, so as to identify one or more of the speech phrases in the speech. One of the candidate communication terminals is correlated with a target user who is associated in the list with the identified speech phrases.

In an embodiment, selecting the candidate communication terminals using the selection criterion includes choosing one or more communication terminals that were not used previously in the communication network. In another embodiment, selecting the candidate communication terminals using the selection criterion includes choosing communication terminals that were not used in the communication network for at least a predefined time period. In yet another embodiment, selecting the candidate communication terminals using the selection criterion includes choosing communication terminals that are located in a predefined geographical area.

In still another embodiment, selecting the candidate communication terminals using the selection criterion includes choosing communication terminals that communicate with one or more predefined communication terminals. In a disclosed embodiment, the method includes reporting the correlated one of the candidate communication terminals and the associated target user, so as to invoke surveillance on the one of the candidate communication terminals.

In an embodiment, selecting the candidate communication terminals using the selection criterion includes receiving from the communication network information relating to voice calls conducted in the network, and choosing the candidate communication terminals based on the received information. Receiving the information may include receiving identifiers of at least some of the multiple communication terminals, and applying the selection criterion to the identifiers. The identifiers may include at least one identifier type selected from a group of types consisting of an International Mobile Subscriber Identity (IMSI), a Mobile Subscriber Integrated Services Digital Network Number (MSISDN) and an International Mobile Equipment Identity (IMEI).

In some embodiments, correlating the one of the candidate communication terminals with the target user includes requesting a warrant for monitoring the one of the candidate communication terminals. In an embodiment, a given speech phrase includes two or more words that are not contiguous in time. In a disclosed embodiment, maintaining the list includes automatically extracting one or more of the speech phrases for a given target user from recorded speech of the given target user.

There is additionally provided, in accordance with an embodiment that is described herein, apparatus including a memory and a processor. The memory is configured to hold a list of target users of a communication network and respective speech phrases that are characteristic of the target users. The processor is configured to maintain the list in the memory, to select a plurality of candidate communication terminals from among multiple communication terminals in the communication network based on a selection criterion, to analyze speech that is communicated via the candidate communication terminals so as to identify one or more of the speech phrases in the speech, and to correlate one of the candidate communication terminals with a target user who is associated in the list with the identified speech phrases.

The present disclosure will be more fully understood from the following detailed description of the embodiments thereof, taken together with the drawings in which:

DETAILED DESCRIPTION OF EMBODIMENTS

Overview

Figure 1:
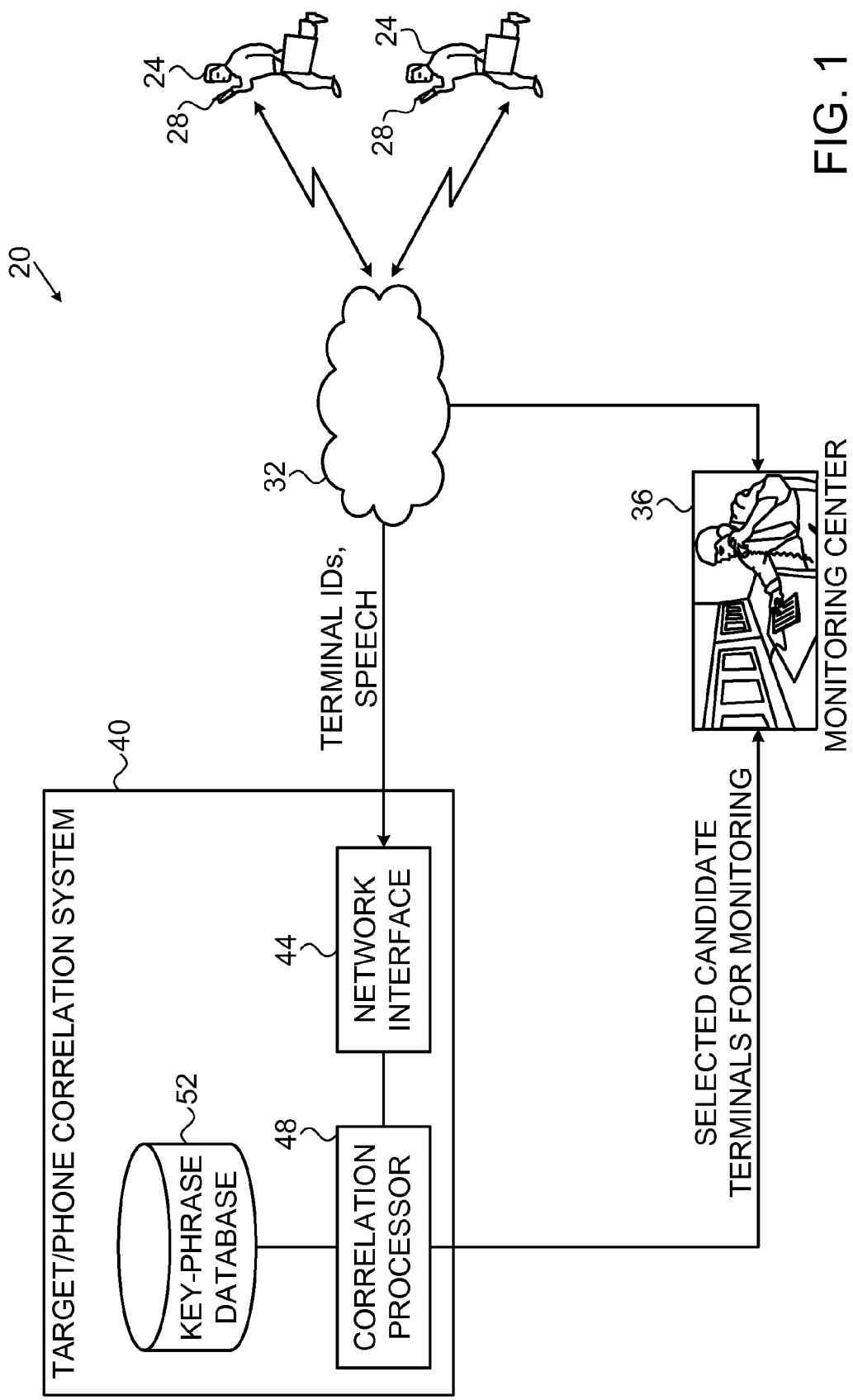
FIG. 1 is a block diagram that schematically illustrates a system for monitoring mobile communication terminals, in accordance with an embodiment that is described herein.

Systems that monitor mobile communication terminals are often required to monitor a relatively small number of terminals, which are operated by particular target users, out of the multitude of terminals that communicate over the network. Identifying terminals that belong to target users is a complicated task, particularly when the target users take measures to evade being monitored.

Embodiments that are described herein provide improved methods and systems for monitoring mobile communication terminals. In some embodiments, a correlation system selects candidate communication terminals to be monitored, and then attempts to identify whether the candidate terminals are indeed operated by target users. Following successful correlation of a candidate terminal with a target user, various surveillance actions can be performed with respect to the terminal.

In the disclosed techniques, correlation of candidate communication terminals with target users is based on identification of speech key-phrases. The system typically maintains a list of the target users and respective speech key-phrases that are characteristic of the target users. When evaluating a given candidate terminal, the system analyzes speech that is communicated via the candidate terminal and attempts to detect one or more of the speech key-phrases in the analyzed speech. If successful, the system associates the candidate terminal with the target user whose key-phrase was detected in the speech.

The system may select candidate terminals for evaluation using various selection criteria, such as terminals that were not used previously in the network, terminals that were switched off or inactive for at least a predefined time period, terminals that are located in a certain geographical area-of-interest, or terminals that communicate with one or more predefined other terminals.

The disclosed two-stage process (selection of initial candidate terminals using a well-designed selection criterion, followed by search for speech key-phrases in the voice calls of these candidates) provides a high-performance trade-off between computational efficiency and reliable selection of candidate terminals. The selection criteria are typically designed to be computationally simple, but on the other hand have high likelihood in selecting candidate terminals that belong to target users. The key-phrase identification process provides reliable verification that the initially-selected candidates are indeed operated by target users. This latter identification process may be computationally intensive, but on the other hand it is applied only to a manageable number of candidate terminals.

The disclosed techniques are thus highly efficient and reliable in selecting terminals that are operated by target users, and therefore enable efficient allocation of limited monitoring resources. Since the disclosed techniques are based on characteristic speech key-phrases, they are effective against hostile users who replace mobile phones or Subscriber Identity Modules (SIM), or take various other measures to evade surveillance.

System Description

FIG. 1 is a block diagram that schematically illustrates a system 20 for mobile communication terminal monitoring, in accordance with an embodiment that is described herein. System 20 monitors a wireless communication network 32, in which users 24 communicate using mobile communication terminals 28.

Network 32 may comprise any suitable type of communication network, typically a cellular network, such as a Global System for Mobile communication (GSM) network, a Universal Mobile Telecommunication System (UMTS) network, a CDMA2000 network or other third generation (3G) or fourth generation (4G) cellular network, a Long-Term Evolution (LTE) network, an Integrated Digital Enhanced Network (IDEN) network or a WiMAX network operating in accordance with the IEEE 802.16 standard.

As yet another example, network 32 may comprise an Internet Protocol (IP) network such as the Internet in which users 24 communicate via Voice-over-IP (VoIP) terminals, a Public Switched Telephone Network (PSTN) or a satellite communication network. Further alternatively, network 32 may comprise any other suitable network type. Terminals 28 may comprise, for example, cellular phones, VoIP terminals, satellite terminals or any other suitable type of communication terminal having voice communication capabilities.

A monitoring center 36 monitors selected mobile communication terminals. Depending on the particular application, the monitoring center may carry out various surveillance functions such as tracking the locations of the monitored terminals, recording and analyzing the communication sessions of the monitored terminals, issuing alerts related to the activity of the monitored terminals, and/or any other suitable function.

Although the example of FIG. 1 shows only two users and two communication terminals for the sake of clarity, real-life networks typically comprise large numbers of users and terminals. Typically, only a small fraction of the users are target users that are of interest to monitoring center 36, while the vast majority of users are innocent.

The term "target user" is used to describe any user who is of interest to the operators of system 20, and in particular monitoring center 36, for any reason. For example, a target user may comprise an individual user who is personally of interest, such as a known terrorist or criminal. As another example, a target user may comprise an individual who is associated with a certain group or class of users, such as a user who has a certain line-of-business or other affiliation. Examples of such classes are drug producers or traffickers, terrorists and hackers. Additionally or alternatively, any other individual or group of individuals that meet a certain criterion may be regarded as target users.

In some embodiments, system 20 comprises a correlation system 40, which selects candidate communication terminals to be monitored by monitoring center 36. System 40 applies predefined selection criteria for selecting candidate terminals, and then uses a list of characteristic speech key-phrases in order to verify which of the candidate terminals is actually operated by a target user.

System 40 comprises a network interface 44, which receives from network 32 information relating to voice calls of terminals 28 in the network. The received information may comprise, for example, speech content of the calls as well as identifiers of the communication terminals that conduct the calls. Example identifiers of terminals 28 may comprise, for example, International Mobile Subscriber Identities (IMSI), Mobile Subscriber Integrated Services Digital Network Numbers (MSISDN), International Mobile Equipment Identities (IMEI), or any other suitable identifier.

System 40 comprises a correlation processor 48, which analyzes the voice calls and other information received from network 32, selects initial candidate terminals for monitoring, and attempts to identify which of these terminals is indeed operated by a pre-specified target user. Candidate terminals that are verified as likely to belong to target users are reported to monitoring center 36.

In some embodiments, processor 48 selects the initial candidate terminals in accordance with one or more predefined selection criteria. The selection criteria are typically designed to discover terminals that are likely to belong to target users with high detection probability and small miss probability. On the other hand, the selection criteria are typically designed to be computationally simple, so that system 40 may process a large volume of voice calls originating from a large number of terminals.

Various selection criteria can be used for selecting initial candidates. Typically, processor 48 selects the initial candidate terminals by examining the terminal identifiers (e.g., IMSI, IMEI or MSISDN) that are provided with the received voice calls. In an example embodiment, processor 48 selects terminals that have not been used before in network 32. For example, processor 48 may hold a list of terminal identifiers that have been used in the network before, and select as initial candidates terminals whose identifiers do not appear on the list. This criterion is effective since some hostile users are known to use new phones or new SIMs for conducting calls related to illegitimate activities.

As another example, processor 48 selects terminals that have not been used in the network (e.g., were switched off or inactive) for at least a predefined time period. In these embodiments, the information provided from the communication network may comprise time stamps or other indications of the times at which the terminals were active in the network.

As yet another example, processor 48 may select terminals that are located in a certain geographical area-of-interest as initial candidates. In these embodiments, the information provided from the communication network may comprise location information of the communication terminals, e.g., cell IDs via which the terminals communicate with the network.

As another example, processor 48 may select as initial candidates terminals that communicate with one or more terminals that are drawn from a predefined list of terminals. This criterion may identify, for example, previously-unrecognized terminals by detecting that they communicate with known target users. In alternative embodiments, processor 48 may select the initial candidate terminals using any other suitable selection criterion.

Having selected a given initial candidate terminal, processor 48 carries out an additional verification stage that verifies whether this terminal is indeed operated by a pre-specified target user. This technique further increases the likelihood of reporting to the monitoring center only terminals that are indeed operated by target users who are of interest. As a result, monitoring resources are allocated and utilized efficiently.

Moreover, in some cases (e.g., under legal constraints in some countries) the monitoring center is not permitted to monitor communication terminals indiscriminately, and is sometimes required to obtain a warrant for each monitored terminal. The additional verification stage can be used as a means for selective monitoring, and as a basis for obtaining such a warrant. In an embodiment, by reporting a candidate terminal that is correlated successfully with a target user, processor 48 causes requesting of a warrant for monitoring the candidate communication terminal.

In the disclosed embodiments, processor 48 verifies that a given initial candidate terminal is operated by a target user by detecting key-phrases in the speech of the voice calls that are conducted via this terminal. System comprises a memory 52 that holds a key-phrase database. The memory may comprise any suitable type of storage device, such as a disk or solid-state memory. The key-phrase database is managed and maintained by processor 48.

The key-phrase database comprises a list of predefined target users. For each target user the database holds one or more speech key-phrases that are characteristic of that target user. The terms "speech key-phrase," "speech phrase" and "key-phrase" are used interchangeably herein. In the context of the present patent application and in the claims, the term "speech phrase that is characteristic of a target user" refers to any phrase whose utterance by a user is indicative of the user identity with high likelihood. Typically although not necessarily, a characteristic speech phrase has a relatively low likelihood of being uttered by users other than the target user in question.

A given speech phrase may comprise a single word or multiple words, which are not necessarily contiguous in time. For example, a given speech phrase may comprise two or more words, which are separated by other words that do not belong to the speech phrase. A speech phrase may comprise any desired combination of words that may be uttered during a voice call. An example speech phrase may comprise a set of different persons' nicknames, so as to lower the probability that a single nickname mentioned in the call refers to a person who is not the desired target. As another example, in an application that monitors target users who are engaged in producing Improvised Explosive Devices (IED), a characteristic speech phrase may comprise a set of chemicals or other materials or objects that are commonly used for producing IED.

Examples of characteristic speech phrases may comprise persons' nicknames, locations (place names), drugs, explosive materials and components that are used for producing IED, phrases that are associated with the line-of-business associated with the target users, and/or any other suitable phrase.

The characteristic speech key-phrases for a particular target user can be defined using any suitable method. For example, the speech key-phrases can be defined manually, e.g., by a human operator who analyzes recorded speech of the target user. Alternatively, characteristic speech key-phrases can be extracted from recorded speech of the target user using various automatic methods.

In one example, characteristic speech phrases can be extracted automatically from recorded speech of the target user by converting this recorded speech, as well as recorded speech of other (innocent) users, to text using automatic speech-to-text conversion. Then, characteristic text phrases or keywords are extracted automatically from the text of the target user. The extracted text phrases may be associated with certain categories. The selection and categorization processes may be assisted by an operator who approves or corrects the automatic process. Once the text phrases are decided upon, they are converted to speech, to produce the characteristic speech phrases. Alternatively, processor 48 may search for speech key-phrases in the voice calls of the initial candidate terminals using any other suitable speech processing method.

The configurations of system 20 and system 40 shown in FIG. 1 are example configurations, which are chosen purely for the sake of conceptual clarity. In alternative embodiments, any other suitable configurations can also be used. For example, system 40 may be implemented as part of monitoring center 36, e.g., sharing the same computing platforms of the monitoring center.

The various elements of system 40 may be implemented in hardware, e.g., using one or more Application-Specific Integrated Circuits (ASICs) or Field-Programmable Gate Arrays (FPGAs). Alternatively, some or all of the elements of system 40 may be implemented in software, or using a combination of hardware and software elements. Typically, processor 48 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Monitoring Method Description

Figure 2:
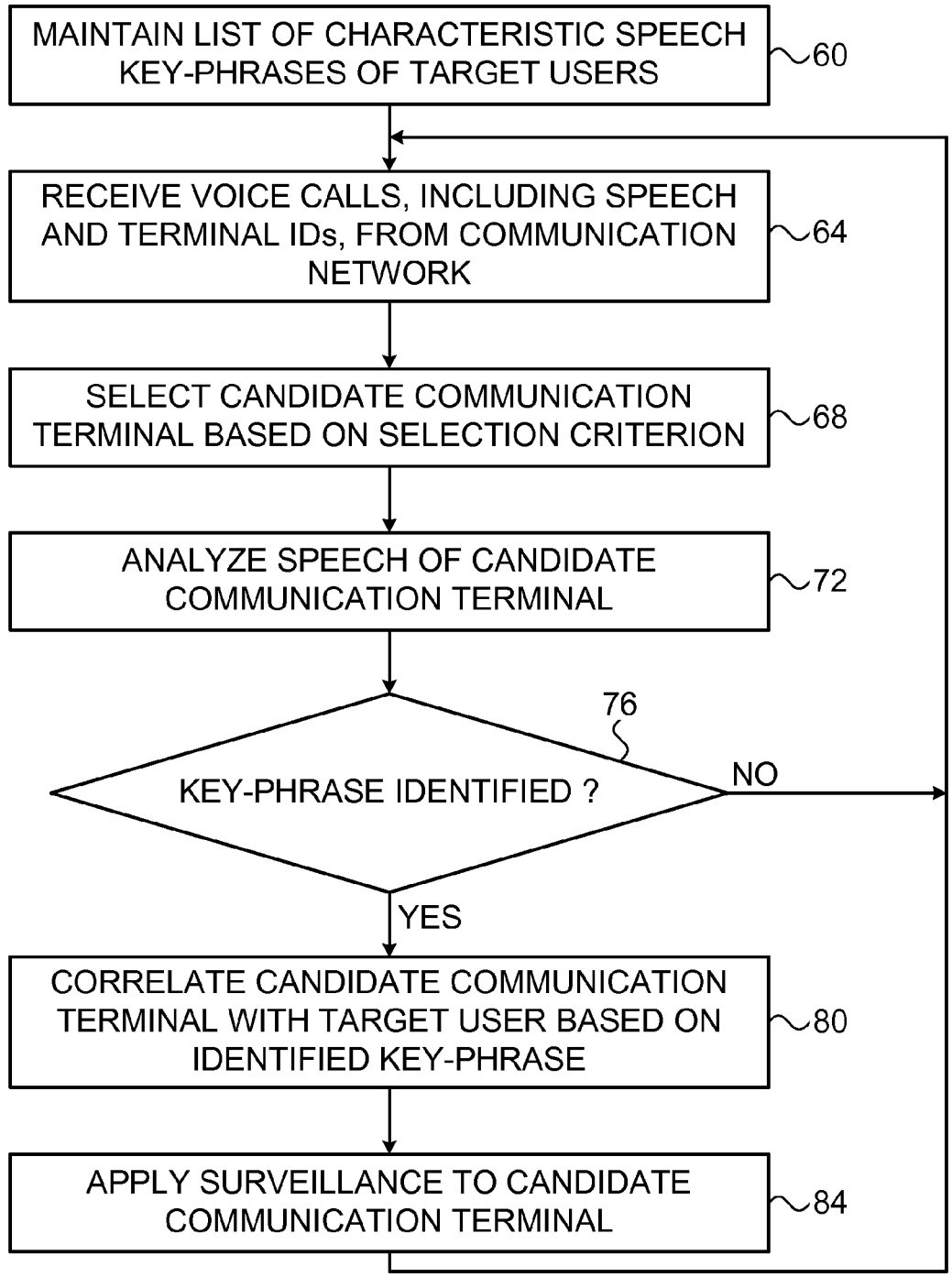
FIG. 2 is a flow chart that schematically illustrates a method for monitoring mobile communication terminals, in accordance with an embodiment that is described herein.

FIG. 2 is a flow chart that schematically illustrates a method for monitoring mobile communication terminals, in accordance with an embodiment that is described herein. The method begins with correlation system 40 maintaining a list of target users and corresponding characteristic speech key-phrases, at a list maintenance step 60. The list may be obtained, for example, from monitoring center 36 or from any other source. The list may be modified at any desired time, e.g., by adding, modifying or deleting target users and/or speech key-phrases.

System 40 receives from network 32 information relating to voice calls conducted in the network, at a call input step 64. The information is received via interface 44, and typically comprises the speech content of the calls and corresponding identifiers of the communication terminals conducting the calls.

Based on this information, correlation processor 48 selects initial candidate terminals that are likely to be operated by target users, at a candidate selection step 68. Processor 48 may use any suitable selection criterion for this purpose, such as the example selection criteria described above.

For a given initial candidate terminal, processor 48 analyzes the speech content of the voice calls conducted using this terminal, at a speech analysis step 72. In this analysis process, processor 48 searches for occurrences of the speech key-phrases that appear on the list defined at step 60 above.

If no speech key-phrases are found in the voice calls of the initial candidate, as checked at a checking step 76, processor 48 concludes that this terminal is not operated by a target user. The method then loops back to step 64 above.

If, on the other hand, one or more key-phrases are found in the voice calls of the initial candidate, processor 48 concludes that this terminal may indeed be operated by a target user, at a correlation step 80. In particular, processor 48 associates the candidate terminal with the target user whose speech key-phrases (according to the list defined at step 60) were found in the speech. System 40 typically reports each candidate terminal for which the key-phrase search process was successful, together with the associated target user, to monitoring center 36.

Monitoring center 36 is thus provided with indications of candidate communication terminals and corresponding target users that are likely to be using these candidate terminals. The monitoring center applies surveillance the reported candidate terminals, at a selective surveillance step 84.

Since each reported candidate terminal is highly likely to be operated by a target user, by virtue of the above-described two-stage selection process, monitoring center 36 is able to allocate surveillance resources efficiently. Moreover, since each candidate terminal is reported together with an identity of the target user using it, the monitoring center is able to apply surveillance actions that match these target users, or prioritize allocation of surveillance resources based on the identities of the target users.

Although the embodiments described herein mainly address Lawful Interception (LI) applications, the principles of the present disclosure can also be used in other applications, such as in fraud prevention. In an example application, voice calls in call centers are scanned using the disclosed techniques in order to identify fraudulent users. Fraudulent users may comprise, for example, users who abuse healthcare insurance by reporting illnesses or accidents multiple times using different identities.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
    maintaining a list of target users of a communication network and respective speech phrases that are characteristic of the target users;
    selecting a plurality of candidate communication terminals from among multiple communication terminals in the communication network based on a selection criterion;
    analyzing speech that is communicated via the candidate communication terminals, so as to identify one or more of the speech phrases in the speech; and
    correlating one of the candidate communication terminals with a target user who is associated in the list with the identified speech phrases.

2. The method according to claim 1, wherein selecting the candidate communication terminals using the selection criterion comprises choosing one or more communication terminals that were not used previously in the communication network.

3. The method according to claim 1, wherein selecting the candidate communication terminals using the selection criterion comprises choosing communication terminals that were not used in the communication network for at least a predefined time period.

4. The method according to claim 1, wherein selecting the candidate communication terminals using the selection criterion comprises choosing communication terminals that are located in a predefined geographical area.

5. The method according to claim 1, wherein selecting the candidate communication terminals using the selection criterion comprises choosing communication terminals that communicate with one or more predefined communication terminals.

6. The method according to claim 1, and comprising reporting the correlated one of the candidate communication terminals and the associated target user, so as to invoke surveillance on the one of the candidate communication terminals.

7. The method according to claim 1, wherein selecting the candidate communication terminals using the selection criterion comprises receiving from the communication network information relating to voice calls conducted in the network, and choosing the candidate communication terminals based on the received information.

8. The method according to claim 7, wherein receiving the information comprises receiving identifiers of at least some of the multiple communication terminals, and applying the selection criterion to the identifiers.

9. The method according to claim 1, wherein a given speech phrase comprises two or more words that are not contiguous in time.

10. The method according to claim 1, wherein maintaining the list comprises automatically extracting one or more of the speech phrases for a given target user from recorded speech of the given target user.

11. Apparatus, comprising:
    a memory, which is configured to hold a list of target users of a communication network and respective speech phrases that are characteristic of the target users; and
    a processor, which is configured to maintain the list in the memory, to select a plurality of candidate communication terminals from among multiple communication terminals in the communication network based on a selection criterion, to analyze speech that is communicated via the candidate communication terminals so as to identify one or more of the speech phrases in the speech, and to correlate one of the candidate communication terminals with a target user who is associated in the list with the identified speech phrases.

12. The apparatus according to claim 11, wherein the processor is configured to select the candidate communication terminals using the selection criterion by choosing one or more communication terminals that were not used previously in the communication network.

13. The apparatus according to claim 11, wherein the processor is configured to select the candidate communication terminals using the selection criterion by choosing communication terminals that were not used in the communication network for at least a predefined time period.

14. The apparatus according to claim 11, wherein the processor is configured to select the candidate communication terminals using the selection criterion by choosing communication terminals that are located in a predefined geographical area.

15. The apparatus according to claim 11, wherein the processor is configured to select the candidate communication terminals using the selection criterion by choosing communication terminals that communicate with one or more predefined communication terminals.

16. The apparatus according to claim 11, wherein the processor is configured to report the correlated one of the candidate communication terminals and the associated target user, so as to invoke surveillance on the one of the candidate communication terminals.

17. The apparatus according to claim 11, wherein the processor is configured to receive from the communication network information relating to voice calls conducted in the network, and to choose the candidate communication terminals based on the received information.

18. The apparatus according to claim 17, wherein the information comprises identifiers of at least some of the multiple communication terminals, and wherein the processor is configured to apply the selection criterion to the identifiers.

19. The apparatus according to claim 11, wherein a given speech phrase comprises two or more words that are not contiguous in time.

20. The apparatus according to claim 11, wherein the processor is configured to automatically extract one or more of the speech phrases for a given target user from recorded speech of the given target user.

* * * * *